Patented June 10, 1952

2,599,649

UNITED STATES PATENT OFFICE 2,599,649

ACETYLENE SOLUTION

Lothar Lorenz, Ludwigshafen-on-the-Rhine, Germany

No Drawing. Application August 9, 1951, Serial No. 241,159. In Germany August 31, 1950

4 Claims. (Cl. 252—1)

This invention relates to acetylene solutions, the recovery of acetylene from gas mixtures by solvent extraction and other processes involving the dissolution of acetylene.

For dissolving acetylene, e. g. in order to store acetylene in metal bottles under increased pressure, or for extracting acetylene from gas mixtures, or increasing the acetylene content in such mixtures, various organic solvents such as ketones, esters, ethers, carbonic acid amides and lactones have been already suggested.

It is an object of this invention to provide a class of excellent solvents for acetylene which have a high dissolving power for this compound, extraordinary stable resistance against chemical attack and a high boiling point. I have found that N-alkyl pyrrolidones the alkyl radical of which is a saturated hydrocarbon radical containing not more than 3 carbon atoms, such as N-methyl or N-isopropyl pyrrolidones, are most suitable for dissolving acetylene.

N-methyl pyrrolidone is capable of dissolving 39 times of its volume of acetylene at 20° C. under normal pressure. This compound as well as its next two higher homologues are excellently suitable as a solvent in storing acetylene under increased pressure. When releasing acetylene from such solutions only very small traces of the solvent are also released owing to the extremely low vapor pressure of the N-alkyl pyrrolidones.

According to my invention acetylene may be very efficiently extracted with N-alkylated pyrrolidones from diluted acetylene as it is obtained, for example, in the thermal or electrical decomposition of low molecular aliphatic hydrocarbons or in the incomplete combustion of such hydrocarbons with oxygen.

It is preferable to treat such gases with the N-alkyl pyrrolidone under increased pressure and releasing the concentrated acetylene from the solutions so obtained by releasing the pressure or raising the temperature. N-alkyl pyrrolidones are particularly suitable for extracting acetylene from such gases as contain also carbon dioxide since the dissolving power for acetylene is much greater than that for carbon dioxide.

I claim:

1. A process of removing acetylene from a gaseous mixture by treating it with a N-alkyl pyrrolidone the alkyl radical of which is a saturated hydrocarbon radical not containing more than 3 carbon atoms.

2. A process of removing acetylene from a gaseous mixture by treating it with N-methyl pyrrolidone.

3. A composition of matter consisting essentially of a solution of acetylene in a N-alkyl pyrrolidone the alkyl radical of which is a saturated hydrocarbon radical not containing more than 3 carbon atoms.

4. A composition of matter consisting essentially of a solution of acetylene in N-methyl pyrrolidone.

LOTHAR LORENZ.

No references cited.